May 11, 1948. J. C. CARTER 2,441,258
PURIFICATION OF SULPHONIC SALTS
Filed Jan. 8, 1945 2 Sheets-Sheet 1
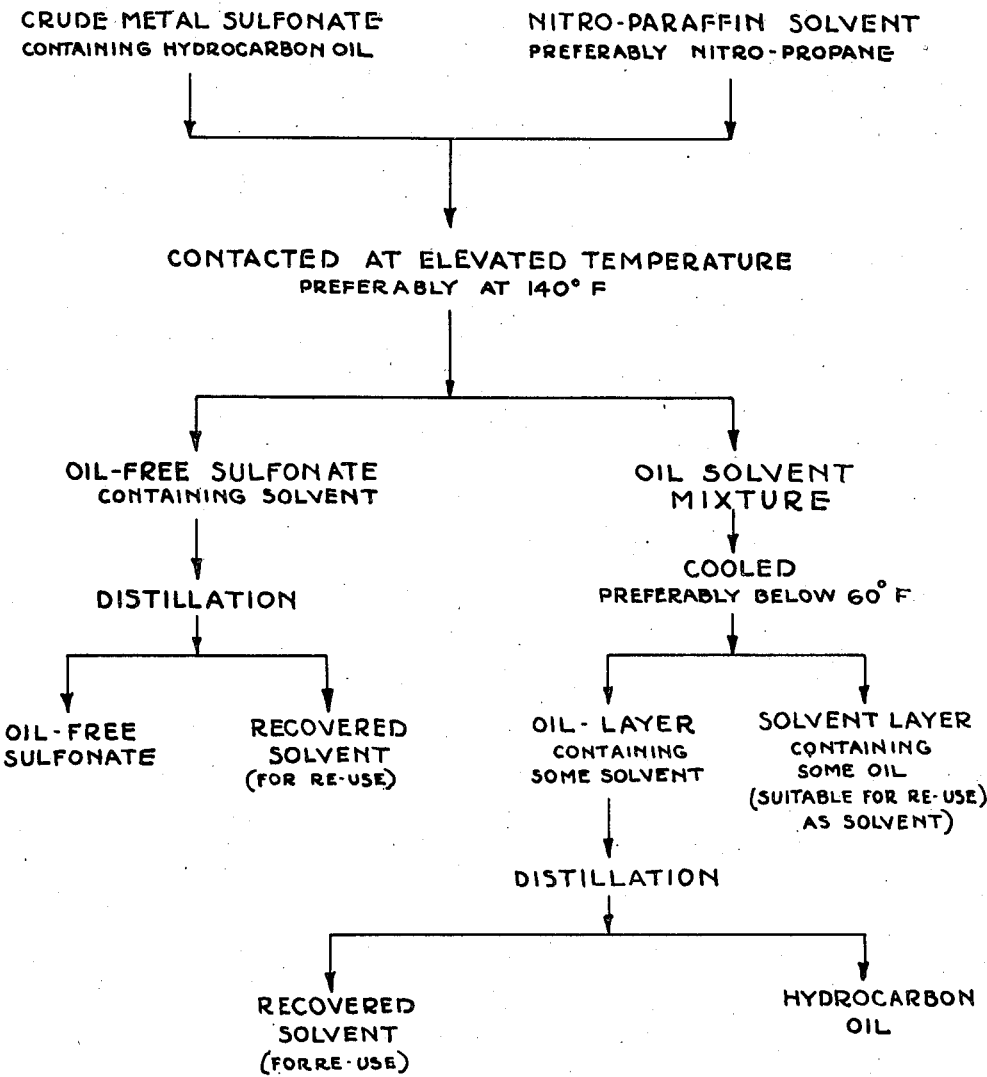

May 11, 1948.    J. C. CARTER    2,441,258
PURIFICATION OF SULPHONIC SALTS
Filed Jan. 8, 1945    2 Sheets-Sheet 2
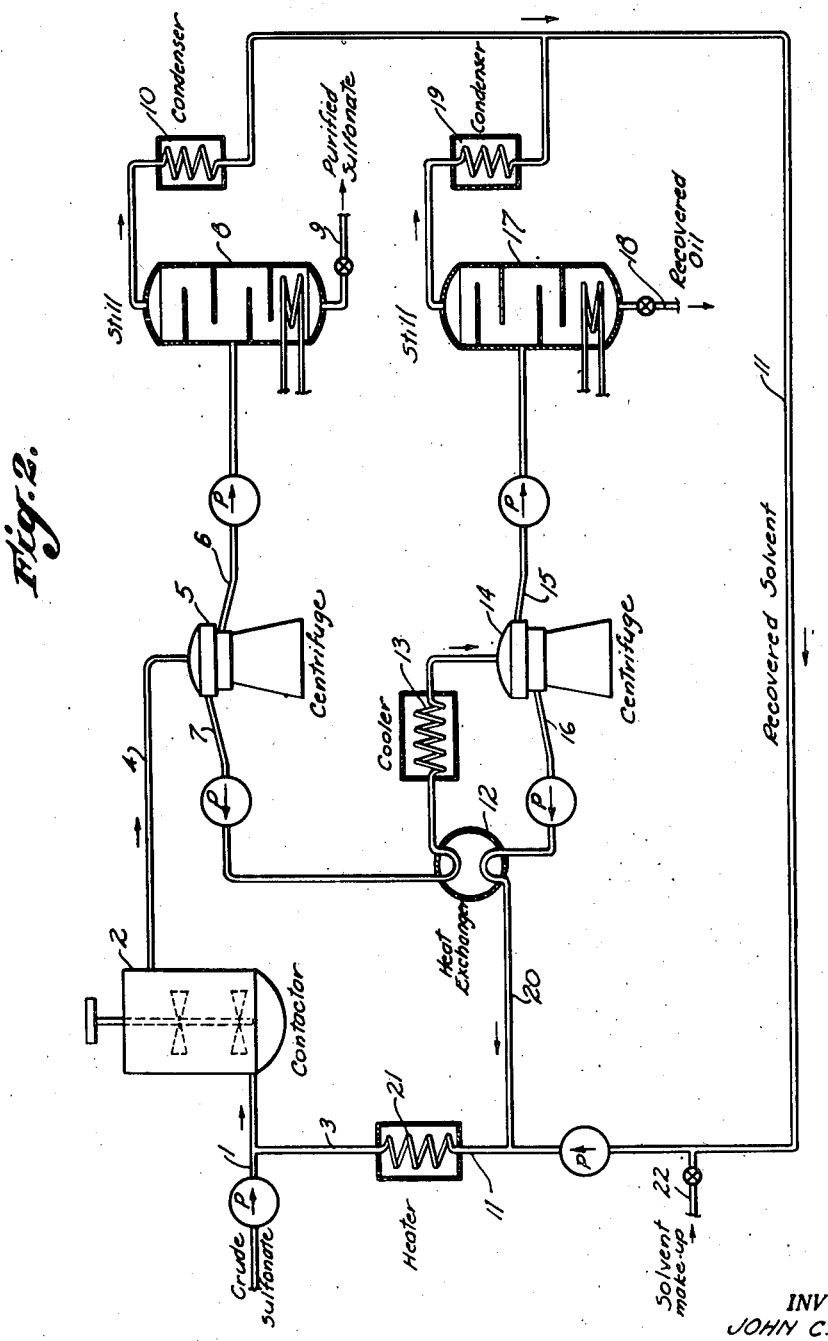
INVENTOR:
JOHN C. CARTER,
BY
ATTORNEY.

Patented May 11, 1948

2,441,258

UNITED STATES PATENT OFFICE 2,441,258

PURIFICATION OF SULPHONIC SALTS

John C. Carter, Berkeley, Calif., assignor to Tide Water Associated Oil Company, San Francisco, Calif., a corporation of Delaware Application January 8, 1945, Serial No. 571,940

5 Claims. (Cl. 260—504)

This invention relates to the separation of sulphonic salts from unsulphonated hydrocarbon matter which is generally present as a contaminant in sulphonic salts derived by conventional processes, as, for example, in the salts of oil-soluble sulphonic acids derived from petroleum. The invention provides a means whereby the contaminating hydrocarbon matter is selectively dissolved in a proper solvent, permitting the separation of the sulphonic salt in substantially pure form and the subsequent recovery of the hydrocarbon matter from the solvent, all as more fully set forth in the following description.

In the treatment of petroleum oil, and similar hydrocarbons, with strong sulphuric acid, either for purifying the oil or for the specific purpose of manufacturing sulphonic acids, there are formed sulphonic acids some of which (the so-called "green" acids) dissolve in the acid sludge while others (the so-called "mahogany acids") remain dissolved in the oil. As generally practiced the mahogany acids are removed from the oil by treatment with aqueous caustic soda, or other alkaline agent, whereby the acids are converted to their corresponding sulphonic salt which dissolves in the aqueous caustic soda. After separation of the aqueous layer the sulphonate is usually recovered by "salting out" or otherwise. The sulphonic salts so recovered, or converted to sulphonate of other desired metals by double decomposition, have found numerous uses in the arts, especially as detergents, but their utility is greatly impaired by the presence of occluded oil which is difficult, if not impossible, to remove by the usual methods employed. Such oil is commonly present to the extent of from about 30% to 80% of the crude sulphonic salt.

It is the principal object of the invention to provide a means whereby crude sulphonic salts may be separated from occluded oil or other hydrocarbon matter.

Another object is to provide a means for recovering hydrocarbon matter from crude sulphonic salts in which the hydrocarbon matter is occluded.

A particular form of the invention has as an object the provision of a cyclic solvent process for extracting occluded hydrocarbon matter from metal sulphonates, in which the amount of evaporation required to recover the solvent is greatly reduced.

Other objects will be apparent as the description proceeds.

In accordance with the invention it has been found that nitro-propane will selectively dissolve mineral oil and other hydrocarbon matter from crude sulphonic salts, permitting the sulphonic salt to be separated in substantially oil-free condition by settling, centrifuging, or filtration. Depending on the amount of oil present and, to a lesser extent on the exact nature of the sulphonic salt, the preferred amount of nitro-propane to be used will vary from about one to four volumes of the solvent for each volume of crude sulphonic salt. The solubility of the oil in the nitro-propane increases with increased temperature and for best results the mixture of crude sulphonate and solvent should be brought to a temperature of about 150° F., at which point rapid separation of the metal sulphonate takes place. At least the mixture should be heated above the point of complete mutual solubility of the oil and the nitro-propane, which point, for the oils tested, is about 100° F., to 110° F.

After separation of the metal sulphonate from the nitro-propane-oil mixture (which may be satisfactorily accomplished by centrifuging, although settling or filtration may be employed if desired) the metal sulphonate will be found to contain approximately 25% of nitro-propane, which may be removed and recovered for further use by distillation.

If desired the nitro-propane may likewise be recovered from the oil by distillation, although it has been found advantageous to cool the nitro-propane-oil mixture below the temperature of complete solubility whereupon the oil separates out as a distinct phase which may be separated by decantation or centrifuging. The nitro-propane thus recovered, though it will be found to contain some oil in solution, may be used for the extraction of another batch of crude sulphonic salt. The oil, containing about one percent of nitro-propane may be subjected to distillation to recover the solvent. By thus separating the oil by cooling the solvent-oil mixture, it will be seen that a substantial amount of distillation is avoided in the recovery of the solvent.

While the process may be carried on in batches, it is well adapted to a continuous process; or, by proper interposition of surge tanks, the process can be conducted partly continuously and partly by batch.

The invention will be better understood by reference to the drawing, Figure 1 of which is a self-explanatory flow-sheet showing the processing steps. Figure 2 illustrates in diagrammatic form apparatus suitable for carrying out continuous processing, in which crude sulphonic salt containing occluded oil entering through line 1 is extracted in contactor 2 with heated solvent from line 3. After extraction the sulphonate-solvent mixture leaves contactor 2 through line 4 and enters centrifuge 5 in which the sulphonate and the solvent, containing the oil in solution, are separated and leave by separate outlets 6 and 7 respectively depending on their relative densities. The sulphonate, while still sufficiently hot to flow readily, is passed to still 8 in which it is stripped of its contained solvent and is withdrawn through line 9. The solvent vapors are condensed in condenser 10 and the condensed solvent is recycled to the process through line 11.

The oil-solvent solution leaving centrifuge 5 through outlet 7 is passed through heat exchanger 12 and cooler 13, wherein it is cooled below the point of complete solubility, and enters centrifuge 14. As a result of the cooling in heat exchanger 12 and cooler 13 the mixture is resolved into an oil phase and a solvent phase which are separated from each other in centrifuge 14, the former leaving through outlet 15 and the latter through outlet 16. The oil phase, still containing some solvent in solution, is passed to still 17 wherein the solvent is distilled off and the recovered oil is withdrawn through line 18. The solvent vapors are condensed in condenser 19 and recycled to the process through line 11.

The solvent phase, leaving centrifuge 14 through outlet 16 and containing some oil in solution, is recycled to the process through heat exchanger 12 and lines 20 and 11.

The recycle solvent in line 11, recovered from condensers 10 and 19 and from line 20, is passed through heater 21 and thence through lines 3 and 1 to contactor 2. In heater 21 sufficient heat is supplied to insure that the mixture in contactor 2 is above the temperature of complete solubility of the solvent and oil. Fresh solvent may be added through line 22 to compensate for any solvent losses in the process.

Suitable pumps P are provided to furnish the required flow of materials through the apparatus. Preferably, vacuum is applied to stills 8 and 17 by suitable means (not shown).

Either 1-nitro-propane or 2-nitro-propane may be used as the solvent, the results being substantially the same, although 1-nitro-propane appears to exert somewhat better solvency for the oil. 1-nitro-1-chloro-ethane has also been found suitable, having similar solvent properties to nitro-propane at similar temperatures. Other nitro-paraffins may also be used, providing conditions are adjusted to compensate for their different solvent properties. For example, with nitro-ethane the temperature of complete solubility is in the vicinity of 175° F., and a considerable amount of heat must be supplied to obtain the required extraction temperature. With nitro-butane and the higher nitro-paraffins, the temperature of complete solubility decreases with increased molecular weight, requiring substantially greater cooling than with nitro-propane to cause separation of solvent from oil. Likewise the boiling point of the nitro-paraffin increases with molecular weight which makes the recovery of solvent from the oil and from the sulphonic salts by distillation more difficult.

As is known, the nitro-paraffins have a tendency to be explosive at the higher temperatures, particularly in the vicinity of their boiling points and above. For this reason nitro-ethane, which requires higher temperatures to effect complete solution of the oil, and nitro-butane and the higher nitro-paraffins, which require higher temperatures for their recovery by distillation, are less suitable for the process than nitro-propane which is the preferred solvent. In any event care should be taken in distilling these solvents and the use of vacuum or steam to reduce the boiling point is strongly recommended.

Following are examples of the process:

*Example 1*

450 parts of crude calcium mahogany sulphonate prepared from oil-soluble petroleum sulphonic acids and containing 67% of oil were contacted with 1000 parts of 1-nitro-propane at a temperature of 140° F. Upon standing for a short time calcium sulphonate settled out as a lower viscous layer which was then drawn off from the upper nitro-propane-oil layer. Upon vacuum distillation of the calcium sulphonate there were recovered 70 parts of nitro-propane and 150 parts of pure calcium sulphonate which, upon cooling, became an amber colored solid mass and which, upon analysis, showed an average molecular weight of 938. The upper layer after separation of the calcium sulphonate was cooled to 50° F., which resulted in the formation of an upper oil layer and a lower solvent layer, which were then separated. The solvent layer was found to contain about 5% of oil and to be suitable for extracting a subsequent batch of crude sulphonate. The oil layer was distilled to recover contained solvent and from the distillation were recovered 30 parts of nitro-propane and 260 parts of dark colored oil which analyzed 2% ash and 1.2% sulphur content.

*Example 2*

19 parts of crude sodium sulphonate derived from caustic soda neutralization of sulphuric acid treated Coalinga lube distillate and containing 42% of occluded oil were heated with 31 parts of 1-nitro-propane to a temperature of 140° F., whereupon three layers were formed: an upper layer (34 parts) of solvent and oil; a middle layer (14 parts) of sodium sulphonate containing some solvent; and a lower layer (2 parts) consisting chiefly of inorganic salts. After separation of the three layers, the upper layer was cooled to 80° F., whereupon an oil layer was formed, which was separated. Upon vacuum distillation of the recovered sodium sulphonate and of the recovered oil there were obtained 9 parts of pure sodium sulphonate (M. W. 449) and 4 parts of oil. Four parts of oil remained in the solvent layer from the second separation most of which could be recovered by further cooling. However, the solvent containing this amount of oil was suitable for subsequent use in extracting further amounts of sulphonate.

*Example 3*

20 parts of crude sodium sulphonate identical to that used in Example 2 were extracted with 60 parts of 1-chloro, 1-nitro-ethane at a temperature of 140° F. Due to the relatively high density of the solvent, the extracted sodium sulphonate settled out in a layer above the solvent-oil solution, while the inorganic salts settled as a third layer below the solvent-oil solution. After separation of the three layers, the solvent-oil layer was cooled to 80° F., whereupon an oil layer was formed which was separated. Vacuum distillation of the oil layer and the sodium sulphonate layer to remove contained solvent yielded products of similar quantity and nature as obtained in Example 2.

*Example 4*

20 parts of crude sodium sulphonate identical to that used in Example 2 were extracted with 40 parts of 2-nitropropane under conditions similar to that used in Example 2. Similar products in similar quantity were obtained.

The foregoing description has been directed primarily to explaining the invention in relation to the removal of occluded oil from sulphonic salts derived from petroleum oils, for which purpose the invention is particularly adapted. However, the invention is applicable to the purification of sulphonic salts derived from other mineral oils, such as shale oils for example, and from synthetic hydrocarbon oils. As is well known many petroleum oils, shale oils, and even synthetic oils do not consist entirely of hydrocarbons but contain varying amounts of non-hydrocarbons generally recognized as impurities. Likewise, after treatment with sulfonating agents various sulpho- and thio-compounds are present which do not, under the conditions of neutralization, form salts. As used in the description and in the claims the term "oil" is intended to denote the hydrocarbon oil together with such dissolved impurities, if any.

I claim:

1. A method of removing oil from a metal mahogany sulphonate having occluded oil as an impurity, while avoiding the need for washing with a water soluble organic solvent, which comprises treating one part of impure metal mahogany sulphonate with more than one part of a water-immiscible selective solvent to dissolve the oil, and then separating the undissolved metal sulphonate from the oil-solvent solution, said solvent being a nitro-paraffin and the temperature of treating is in excess of the point of complete mutual solubility of the oil and solvent.

2. The method of claim 1 in which the nitroparaffin has from two to four carbon atoms per molecule.

3. The method of claim 1 in which the nitroparaffin is a nitro-propane and the treating temperature is above 140° F.

4. The method of claim 1 in which the nitroparaffin is a chloro-nitro-ethane.

5. A cyclic process for extracting oil from a mahogany sulphonate which comprises: treating one part of a metal mahogany sulphate having oil as an impurity with from one to four parts of a nitro-paraffin having from one to four carbon atoms to the molecule, at a temperature above that of complete solubility of the oil and solvent, separating the resulting oil-solvent phase from the undissolved sulphonate, cooling the oil-solvent phase until an oil phase separates from the solvent and then returning the solvent thus diminished in oil content to treat further portions of impure sulphonate, thus avoiding the distillation of the solvent in order to recover it for re-use.

JOHN C. CARTER.

REFERENCES CITED

The following references are of record in the file of this patent:

UNITED STATES PATENTS

| Number | Name | Date |
|---|---|---|
| 1,495,891 | Divine | May 27, 1924 |
| 2,036,469 | Field | Apr. 7, 1936 |
| 2,140,263 | Kessler | Dec. 13, 1938 |
| 2,168,315 | Blumer | Aug. 8, 1939 |
| 2,218,174 | Lazar | Oct. 15, 1940 |
| 2,236,933 | Beck | Apr. 1, 1941 |
| 2,246,374 | Lohmann | June 17, 1941 |

OTHER REFERENCES

Hass, "Chemical Reviews," vol. 32, pages 386-388.